United States Patent
Hengel et al.

(10) Patent No.: US 7,645,105 B2
(45) Date of Patent: Jan. 12, 2010

(54) PROJECTION WELDED FASTENER WITH INTEGRAL SEALER

(75) Inventors: James F. Hengel, Romeo, MI (US); Pei-Chung Wang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 617 days.

(21) Appl. No.: 11/475,497

(22) Filed: Jun. 27, 2006

(65) Prior Publication Data
US 2007/0295698 A1 Dec. 27, 2007

(51) Int. Cl.
*F16B 37/06* (2006.01)

(52) U.S. Cl. .............. 411/171; 411/371.1; 277/931; 24/270; 219/93

(58) Field of Classification Search .......... 411/171, 411/369, 371.1, 542; 277/931, 933; 403/270, 403/271; 219/93; 228/140
See application file for complete search history.

(56) References Cited

U.S. PATENT DOCUMENTS

| | | | | |
|---|---|---|---|---|
| 2,245,298 A | * | 6/1941 | Proctor | 219/107 |
| 2,413,370 A | | 12/1946 | Palmer | |
| 3,399,589 A | * | 9/1968 | Breed | 411/428 |
| 3,435,871 A | * | 4/1969 | Johnson | 411/171 |
| 3,601,574 A | * | 8/1971 | Fiddler | 219/83 |
| 4,130,751 A | * | 12/1978 | Gordon | 219/98 |
| 4,250,596 A | | 2/1981 | Hara et al. | |
| 4,263,831 A | | 4/1981 | Smith | |
| 4,409,460 A | * | 10/1983 | Nishii et al. | 219/93 |
| 4,480,166 A | * | 10/1984 | Leech | 219/118 |
| 4,551,189 A | | 11/1985 | Peterson | |
| 4,566,924 A | | 1/1986 | Hara et al. | |
| 4,636,124 A | | 1/1987 | Gugle et al. | |
| 4,702,939 A | | 10/1987 | Miyauchi et al. | |
| 4,832,549 A | * | 5/1989 | Shibayama et al. | 411/171 |
| 4,945,625 A | | 8/1990 | Winston | |
| 5,253,965 A | | 10/1993 | Angel | |
| 5,533,850 A | | 7/1996 | Ishihara et al. | |
| 5,593,120 A | | 1/1997 | Hamerski | |
| 6,755,601 B2 | | 6/2004 | Ohta | |
| 7,399,942 B2 | * | 7/2008 | Wang et al. | 219/93 |

FOREIGN PATENT DOCUMENTS

| | | |
|---|---|---|
| DE | 29722126 U1 | 5/1998 |
| JP | 5-318135 A | 12/1993 |
| KR | 1995-1308 | 2/1995 |

* cited by examiner

*Primary Examiner*—Flemming Saether

(57) ABSTRACT

A fastener is provided for projection resistance welding to a panel. The fastener includes a base having a fastening element, such as a threaded stud or a nut integral therewith. Multiple projections formed integral with the base extend therefrom to engage with the panel to be welded to the panel by electric resistance welding. A groove is provided in the base facing the panel and is filled with a heat activated expandable sealer material. Upon heating of the base during the electric resistance welding, or in an oven, the sealer expands to fill and seal any gap between the base and the panel.

18 Claims, 4 Drawing Sheets

PROJECTION WELDED FASTENER WITH INTEGRAL SEALER

FIELD OF THE INVENTION

The present invention relates to a fastener that is projection welded to an aperture panel and a sealer is applied to seal the gap between the fastener and the panel.

BACKGROUND OF THE INVENTION

It is known in the automobile and other industries that a fastener, such as a threaded stud or a nut can be welded to a sheet metal panel or other member. The fastener has multiple projections formed on the surface that will be welded to the panel. An electrode is applied to the fastener and a back up electrode is applied to the panel. Electric resistance weld current is conducted through the electrodes and is concentrated through the projections creating electric resistance welds between the projections and the panel.

In many applications, the panel will have an aperture that aligns with the fastener. In the case of a threaded stud, the threaded stud may extend through the aperture. In the case of the fastener being a nut, a bolt that will be eventually threaded into the nut can reach through the aperture. In either case, the projections formed on the fastener will typically leave a small gap between the base of the fastener and the panel. It is desirable to seal this small gap to prevent the passage of noise or liquid or gaseous matter.

SUMMARY OF THE INVENTION

A fastener is provided for projection resistance welding to a panel. The fastener includes a base having a fastening element, such as a threaded stud or a nut integral therewith. A plurality of projections are formed integral with the base and extend therefrom to engage with the panel and be welded to the panel by electric resistance welding. A groove is provided in the base facing the panel and is filled with a heat activated expandable sealer material. Upon heating of the base during the electric resistance welding, the sealer expands to fill and seal any gap between the base and the panel.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
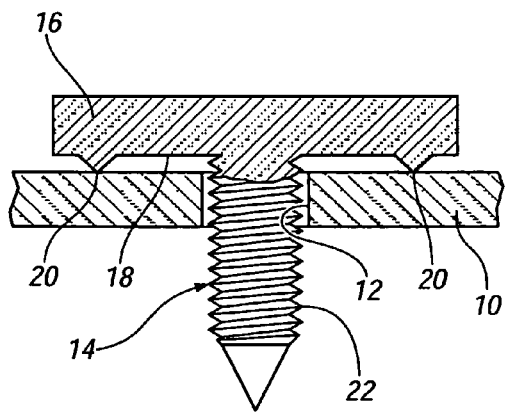
FIG. 1 is a side elevation view having parts broken away and in section showing a prior art weld stud seated in an aperture of a panel.

Referring to FIG. 1, a sheet metal panel 10 has an aperture 12. A prior art weld stud 14 includes a circular base 16 having a surface 18 from which a plurality of projections 20 extend. A threaded shank 22 extends from the surface 18 of the base 16. FIG. 1 shows the weld stud 14 positioned on the panel 10 with the projections 20 engaging the panel 10 and the threaded shank 22 extending through the aperture 12 of the panel 10.

Figure 2:
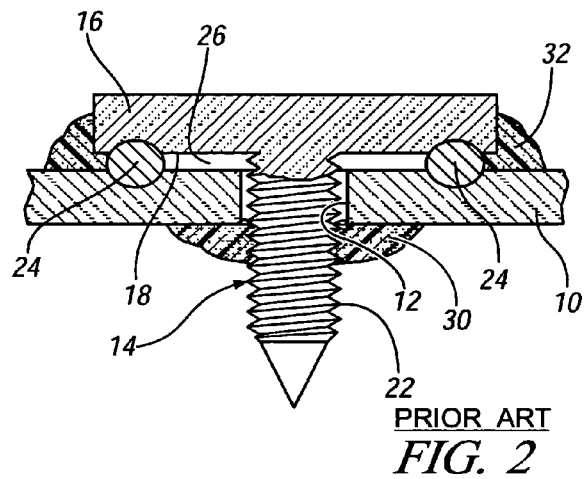
FIG. 2 shows the weld stud of FIG. 1 welded to a panel and a sealer applied to seal the gap between the prior art weld stud and the panel.

FIG. 2 shows the weld stud 14 having been projection welded to the panel 10. The projection welding operation is well known in the fastening industry and includes positioning an electrode against the base 16 of the weld stud 14 and placing a backup electrode on the panel 10. Electric weld current is applied and induces electrical resistance heating at the point of contact between the projections 20 and the panel 10 to create welds 24 between the weld stud 14 and panel 10. However, as seen in FIG. 2, the height of the projections is such that a gap 26 will remain between the surface 18 of the base 16 and the panel 10. The presence of such a gap 26 and the fact that the projections 20 are spaced at intervals around the periphery of the base 16 may allow the passage of moisture, gases or noise through the aperture 12. Accordingly, it is known to apply a bead of sealer to close off the gap 26. The sealer is applied after the welding operation and conventionally involves the use of pumps and hoses and nozzles that will add labor and cost and complexity to the manufacturing operation. As seen in FIG. 2, the sealer may be applied as a bead of sealer 30 that surrounds the threaded shank 22, or a bead of sealer 32 that surrounds the base 16.

Figure 3:
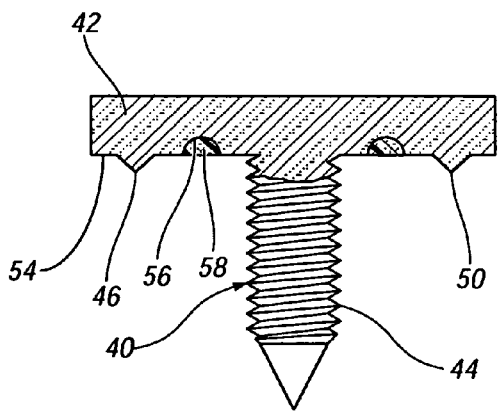
FIG. 3 is a side elevation view having parts broken away and in section showing a new and improved weld stud.
Figure 4:
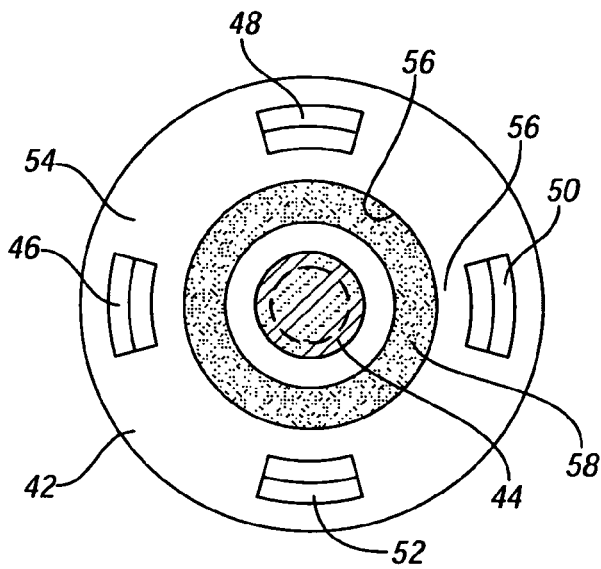
FIG. 4 is a bottom view of the weld stud of FIG. 3.

Referring to FIGS. 3 and 4, a new and improved weld stud 40 is shown having a base 42 from which a threaded shank 44 extends. The base 42 has a plurality of projections 46, 48, 50 and 52 spaced around the circumference and extending from the underside 54 of the base 42. An annular groove 56 is provided in the underside 54 of the base 42 intermediate the threaded shank 44 and the projections 46, 48, 50, and 52 and surrounds the threaded shank 44. The annular groove 56 is outboard of the threaded shank and inboard of the projections 46, 48, 50 and 52. A bead of heat expandable sealer 58, such as Terostat® 4600 MS-CD 473H™ available from the Henkel Company is embedded in the groove 56 by the manufacturer of the weld stud 40.

Figure 5:
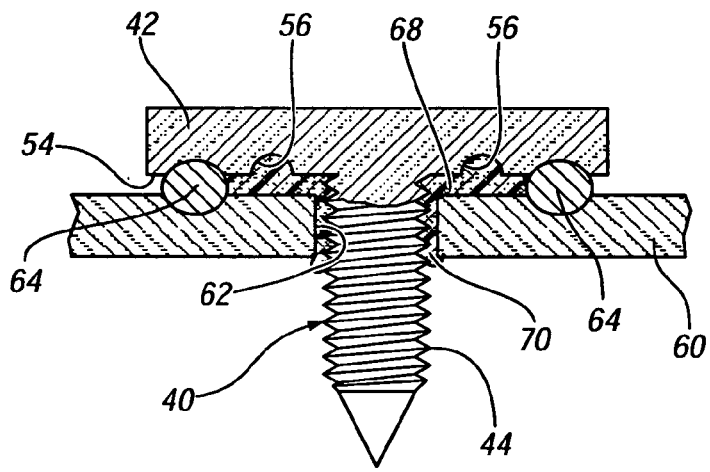
FIG. 5 shows the weld stud of FIGS. 3 and 4 welded and sealed to the apertured panel.

FIG. 5 shows the weld stud 40 attached to a panel 60 having an aperture 62. Electric resistance weld current has been applied to the weld stud 40 and the panel 60. The weld current has caused the formation of welds 64 between each of the projections 86, 88, 90, and 92 and the panel 60. The underside 54 of the base 42 remains spaced somewhat above the surface of the panel 60 so that there is a gap 68 between the underside 54 and the panel 60. There is also a gap 70 between the wall of the aperture 62 and the threaded shank 44. However, the heat generated during the electric resistance welding operation has caused the bead of heat expandable sealer 58 to be expanded and fill the gap 68 and the gap 70 so that neither fluid nor gas nor noise may pass through the aperture 62.

Figure 6:
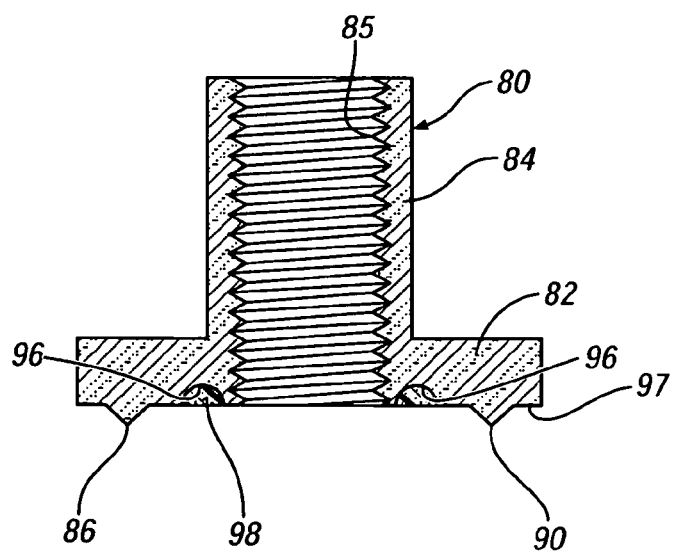
FIG. 6 is a side elevation view of a second embodiment of the invention showing a weld nut.
Figure 7:
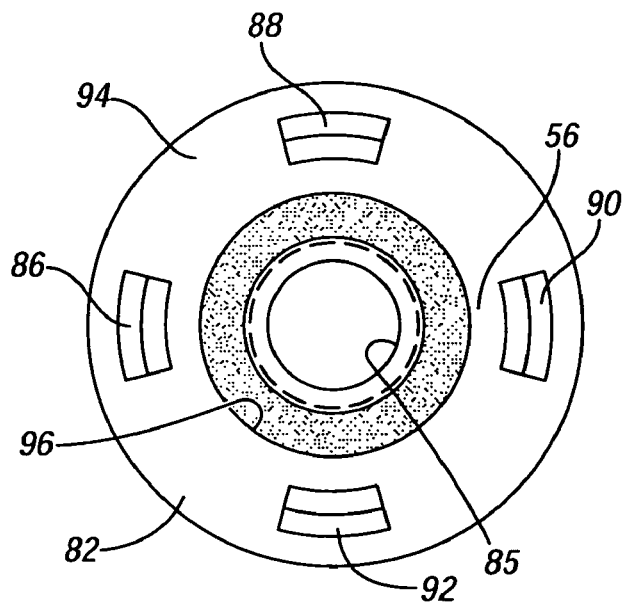
FIG. 7 is a bottom view of the weld nut of FIG. 6 that is placed upon a panel having an aperture, and ready for welding and sealing.

FIGS. 6 and 7 show another embodiment of the invention in which a weld nut 80 is shown having a base 82 and an internally threaded nut 84 having a threaded bore 85. The base 82 has a plurality of projections 86, 88, 90 and 92 spaced around the circumference and extending from the underside 94 of the base 82. An annular groove 96 is provided in the underside 97 of the base inboard of the projections 46, 48, 50 and 52. A bead of heat expandable sealer 98 is embedded in the groove 96 by the manufacturer of the weld nut 80.

Figure 8:
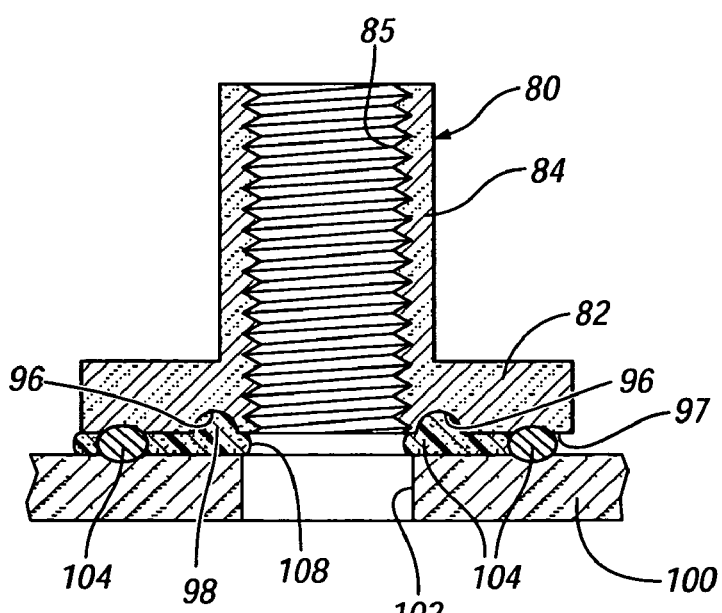
FIG. 8 is shows the weld nut of FIGS. 6 and 7 welded and sealed to the panel.

FIG. 8 shows the weld nut 80 attached to a panel 100 having an aperture 102 that aligns with the threaded bore 85. Electric resistance weld current has been applied to the weld nut 80 and the panel 100. The weld current has caused the formation of welds 104 between each of the projections 86, 88, 90 and 92 and the panel 100. The underside of the base 82 remains spaced somewhat above the surface of the panel 100 so that there is a gap 108 between the underside 97 of the base 82 and the panel 100. However, the heat generated during the electric resistance welding operation has caused the bead of heat expandable sealer 98 to be expanded and fill the gap 108 so that neither fluid nor gas nor noise may pass between the base 82 and the panel 100.

Figure 9:
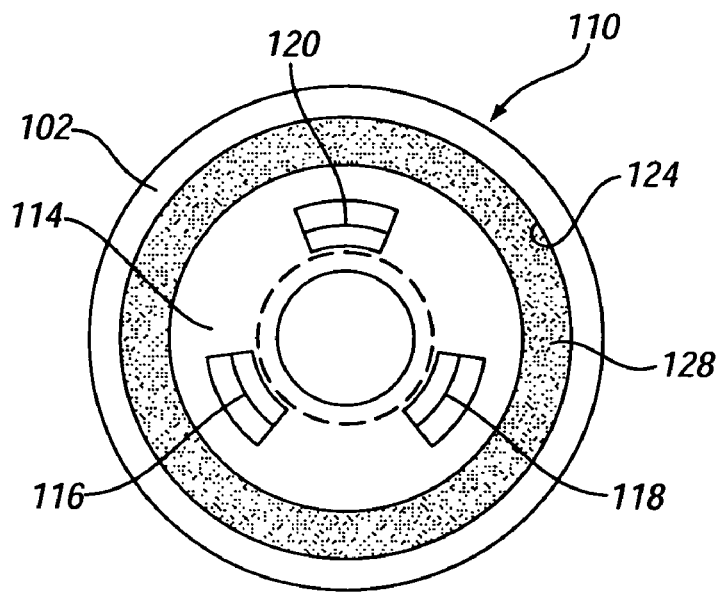
FIG. 9 is a bottom view of yet another embodiment of a weld nut.

FIG. 9 is a bottom view of another embodiment of the invention in which fastener 110 is a weld nut having a base 102 with an underside surface 114. Projections 116, 118 and 120 extend downwardly from the underside surface 114 and are adapted to be projection welded to a panel. An annular groove 124 is provided on the underside surface 114 and is filled with a heat expandable sealer 128. In the embodiment of FIG. 9, the groove 124 for the sealer 128 is outboard of the projections 116, 118 and 120.

Figure 10:
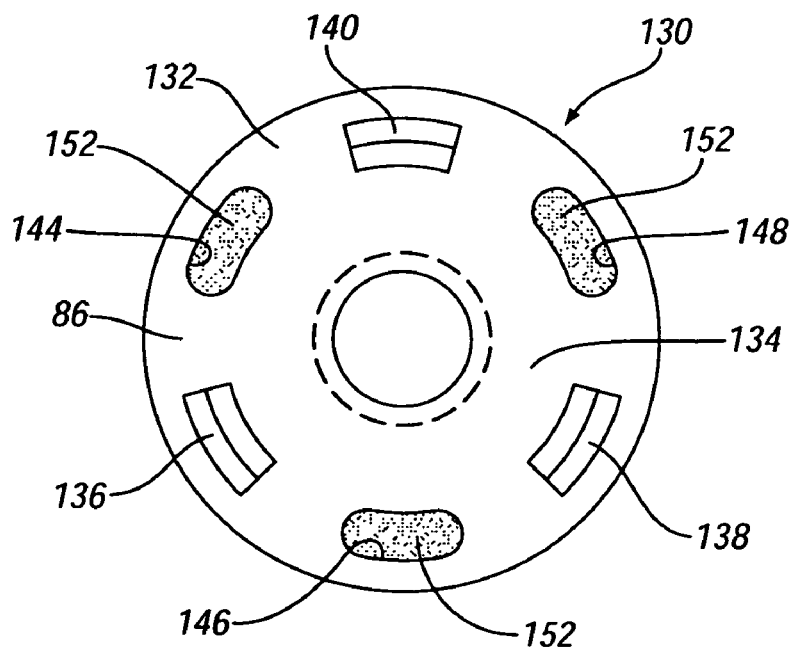
FIG. 10 is a bottom view of yet another embodiment of the invention.

FIG. 10 is a bottom view of yet another embodiment of the invention in which fastener 130 has a base 132 having an underside surface 134. Projections 136, 138 and 140 extend downwardly from the underside surface 134 and are adapted to be projection welded to a panel. A groove in the form of spaced apart pockets 144, 146 and 148 are provided in the underside surface 134, and contain a sufficient volume of heat expandable sealer 152 to assure that expansion of the sealer will cause the sealer to expand and flow sufficiently to fully seal the entire gap existing between the base 132 and the panel to which the fastener 130 will be projection welded. FIG. 10 shows the projections and pockets as alternating around the circumference of the base 132 at the same diameter as the projections, it being understood that the pockets could also be situated either inboard or outboard of the projections if desired.

The description foregoing of the invention is merely exemplary in nature and, thus, variations thereof are intended to be within the scope of the invention. Accordingly, the groove for storing the heat expandable sealer can be inboard of the projections or the groove can be located outboard of the projections. In addition, the groove can be an annular groove that is continuous around the base, or the groove may be provided by spaced apart pockets that are formed in the base and store a sufficient volume of the sealer embedded therein to assure that expansion of the sealer will cause the sealer to expand and flow sufficient to fully seal the entire gap existing between the base and the panel. Although the drawing show a groove that is half round in cross section, the groove can have any cross sectional shape.

It will be understood that the heat expandable sealer is preferably selected and formulated to be heat expanded in response to the temperature and duration of heating that occurs during the electric resistance heating of the fastener base and projections during the projection welding process. However, in some applications, the heat expansion will not occur until the fastener and the panel are heated in an oven, such as a paint curing oven, or the expansion may occur partly during the projection welding process and partly during the heating in a paint curing oven.

The heat expandable sealer may be Terostat® 4600 MS-CD 473H™ available from the Henkel Company, or any other sealer or adhesive or adhesive sealer that exhibits the desired characteristics of being expandable upon heating by the heat created during the projection welding process or during subsequent processing of the fastener and the panel through an oven such as a paint curing oven.

In addition, although the drawings show the examples of the fastener being a weld stud 40 and a weld nut 80, the fastener can be of any known fastener design, such as a rivet, a clip or other fastener that has a base with projection for projection welding to a panel or other work piece.

Furthermore, although the drawings show the groove as having an accentuated depth cut into the surface 54 or 97 of the fastener base, the groove may be defined more simply by the provision of the height of the projections being sufficient to allow the needed volume of sealer to be stored upon the surface 18.

Although the foregoing description refers the fastener being welded to a panel, it will be understood that the panel may be any object of metallic manufacture such as a casting, a forging, or a stamping.

Thus it is seen that the invention provides a new and improved projection welded fastener that eliminates the need for secondary sealing operation and equipment in a manufacturing plant.

What is claimed is:

1. A fastener for projection resistance welding to a panel; comprising:
    a base having a fastening element integral therewith;
    a plurality of projections integral with the base and extending therefrom to engage with the panel for electrical resistance projection welding to the panel;
    a groove provided in the base;
    and a heat activated expandable sealer material deposited in the groove and being heat expanded upon heating of the base to create a seal between the base and the panel.

2. The fastener of claim 1 in which the fastening element is a stud that extends from the base.

3. The fastener of claim 2 in which the stud is threaded.

4. The fastener of claim 2 in which the fastening element is a nut having an internally threaded hole.

5. The fastener of claim 1 in which the groove extends circumferentially around the base.

6. The fastener of claim 5 in which the groove is located on the base further outboard than the projections.

7. The fastener of claim 5 in which the groove is located on the base inboard of the projections.

8. The fastener of claim 1 in which the groove provided in the base is a plurality of separate pocket that contain sufficient heat expandable sealer to expand into sealing contact with the base and the panel.

9. The fastener of claim 1 in which the sealer is heated and expanded during the electrical resistance projection welding of the projections to the panel.

10. The fastener of claim 1 in which the sealer is at least partly expanded during the electrical resistance projection welding of the projections to the panel and partly expanded by heating the fastener and the panel in an oven.

11. A fastener for projection resistance welding to a panel having an aperture, comprising:

a base having a fastening element integral therewith;

a plurality of projections integral with the base and extending therefrom to engage with the panel and adapted to be electric resistance welded to the panel upon the passage of weld current between the fastener and the panel;

and a groove provided in the base and containing heat activated expandable sealer material that is heated and electric resistance heating of the sealer during the projection resistance welding of the projections to the panel to seal any space between the base and the panel.

12. The fastener of claim 11 in which the fastening element is a stud that extends from the base and is adapted to extend through the aperture in the panel.

13. The fastener of claim 12 in which the stud is threaded.

14. The fastener of claim 12 in which the fastening element is a nut having an internally threaded hole that is adapted to align with the aperture in the panel.

15. The fastener of claim 11 in which the groove extends circumferentially around the base and completely surrounds the aperture in the panel to thereby seal any space between the base and the panel.

16. The fastener of claim 15 in which the groove is located on the base further outboard than the projections.

17. The fastener of claim 15 in which the groove is located on the base inboard of the projections.

18. The fastener of claim 11 in which the groove provided in the base is a plurality of separate pocket that contain sufficient heat expandable sealer to expand into sealing contact with the base and the panel.

\* \* \* \* \*